US011061889B2

(12) United States Patent
Chong et al.

(10) Patent No.: US 11,061,889 B2
(45) Date of Patent: Jul. 13, 2021

(54) SYSTEMS AND METHODS OF MANAGING MANIFEST REFRESH IN A DATABASE

(71) Applicant: salesforce.com, inc., San Francisco, CA (US)

(72) Inventors: Terry Chong, Pleasanton, CA (US); Jameison Bear Martin, Oakland, CA (US); Thomas Fanghaenel, Oakland, CA (US)

(73) Assignee: salesforce.com, inc., San Francisco, CA (US)

( * ) Notice: Subject to any disclaimer, the term of this patent is extended or adjusted under 35 U.S.C. 154(b) by 402 days.

(21) Appl. No.: 16/139,166

(22) Filed: Sep. 24, 2018

(65) Prior Publication Data

US 2020/0097581 A1    Mar. 26, 2020

(51) Int. Cl.
*G06F 16/23* (2019.01)
*G06F 3/06* (2006.01)
*G06F 16/245* (2019.01)

(52) U.S. Cl.
CPC ........ *G06F 16/2379* (2019.01); *G06F 3/0608* (2013.01); *G06F 3/0652* (2013.01); *G06F 3/0673* (2013.01); *G06F 16/245* (2019.01)

(58) Field of Classification Search
None
See application file for complete search history.

(56) References Cited

U.S. PATENT DOCUMENTS

| | | | | |
|---|---|---|---|---|
| 9,152,686 | B2 * | 10/2015 | Whitehead | G06F 11/1451 |
| 9,460,008 | B1 * | 10/2016 | Leshinsky | G06F 12/0238 |
| 9,471,610 | B1 * | 10/2016 | Long | G06F 16/2228 |
| 2014/0019962 | A1 * | 1/2014 | Litty | G06F 21/56 718/1 |
| 2018/0089239 | A1 * | 3/2018 | Gattegno | G06F 16/221 |
| 2018/0121492 | A1 * | 5/2018 | Sawhney | G06F 16/2365 |
| 2020/0034056 | A1 * | 1/2020 | Hildenbrand | G06F 3/0664 |
| 2020/0097580 | A1 * | 3/2020 | Nayak | G06F 16/2336 |

* cited by examiner

*Primary Examiner* — Richard L Bowen
(74) *Attorney, Agent, or Firm* — Butzel Long; Butzel Long/salesforce

(57) ABSTRACT

Systems and methods are provided for receiving, at a database system having a memory and at least one persistent storage device to store records, a query for a least one record, where the query uses a first version of a manifest, and where each version of the records that are stored in the at least one persistent storage device are represented by metadata that is part of the first version of the manifest. A first operation may be performed based on a scan operation. The database system may determine whether a purge of the memory has occurred after the first operation. When it is determined that the memory purge has occurred, the scan operation may be restarted from a last position of the scan operation prior to the memory purge using a second version of the manifest.

16 Claims, 7 Drawing Sheets

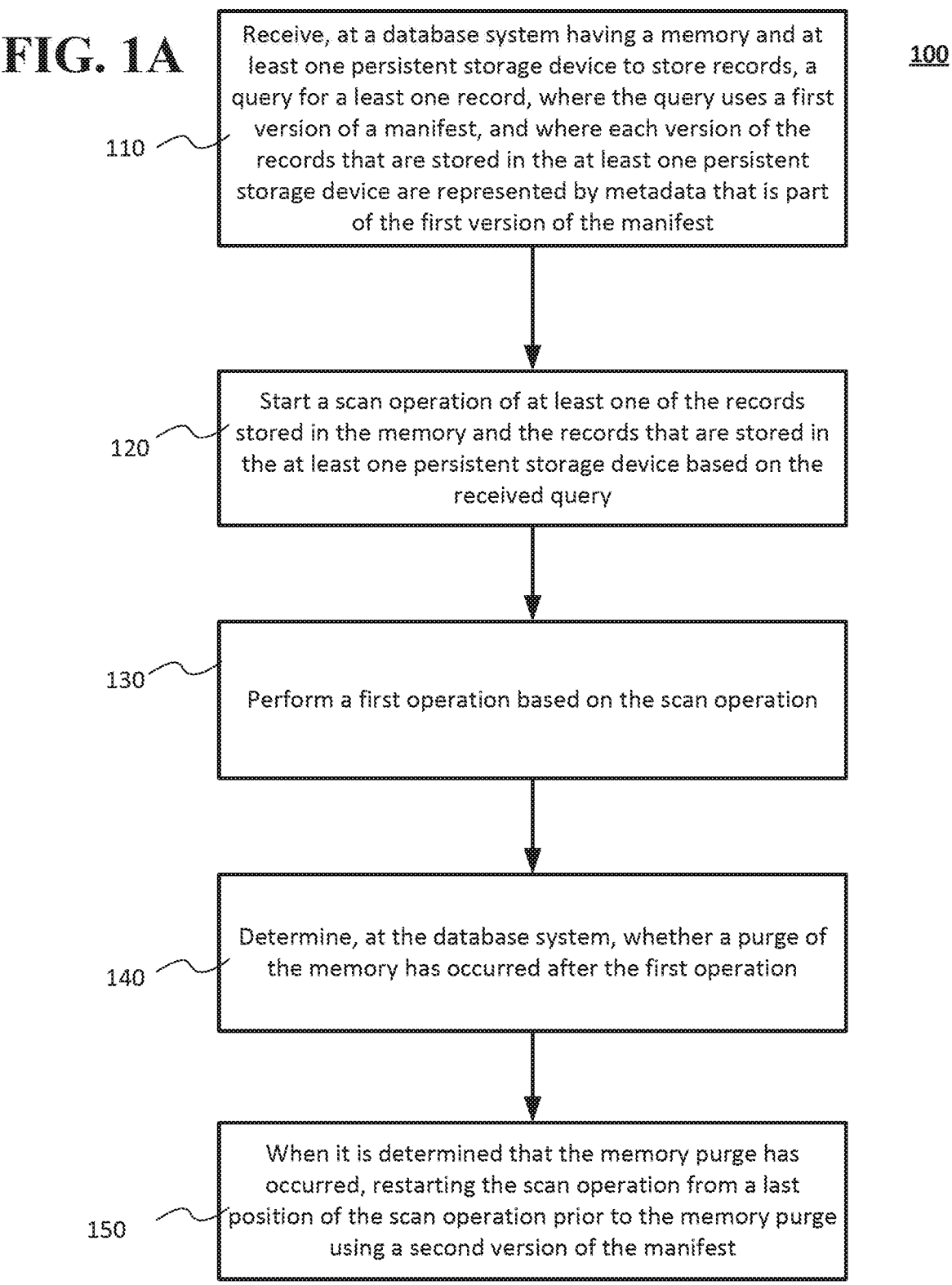

FIG. 2A

*Memory:* a, c, g
*Persistence:*
First Version of Manifest (maximum flush XCN = 8): b, d, e

*Purger:* purge target XCN = 0

FIG. 2B

*Memory:* a
*Persistence:*
Second Version of Manifest (maximum flush XCN = 10): a,b,c,d,e,g
First Version of Manifest (maximum flush XCN = 8): b, d, e

*Purger:* purge target XCN = 10

FIG. 3A

Memory: a(9),c(3)    Purger: purge target XCN = 4
Persistence:
First Version of Manifest (maximum flush XCN =7);    c(3)

FIG. 3B

Memory: a(9)    Purger: purge target XCN = 4
Persistence:
First Version of Manifest (maximum flush XCN =7);    c(3)

SYSTEMS AND METHODS OF MANAGING MANIFEST REFRESH IN A DATABASE

BACKGROUND

Traditional database systems flush both committed and uncommitted transactions. That is, all transactions, whether committed or uncommitted, are periodically flushed from a memory to immutable storage. Such systems do not track which records in memory have been persisted in storage prior to performing a purge operation to generate free space in the memory for new transactions. Rather, such systems need to track the status of the committed and uncommitted transactions after flushing them to storage.

BRIEF DESCRIPTION OF THE DRAWINGS

The accompanying drawings, which are included to provide a further understanding of the disclosed subject matter, are incorporated in and constitute a part of this specification. The drawings also illustrate implementations of the disclosed subject matter and together with the detailed description serve to explain the principles of implementations of the disclosed subject matter. No attempt is made to show structural details in more detail than may be necessary for a fundamental understanding of the disclosed subject matter and various ways in which it may be practiced.

FIGS. 1A-1C show a method of restarting a scan operation from a last position using a new version of a manifest when it is determined that a memory purge has occurred according to implementations of the disclosed subject matter.

FIGS. 2A-2B show an example of checking for a purge operation during a scan in accordance with implementations of the disclosed subject matter.

FIGS. 3A-3B show an example of an active purge occurring when a scan operation starts in accordance with implementations of the disclosed subject matter.

DETAILED DESCRIPTION

Figure 1B:
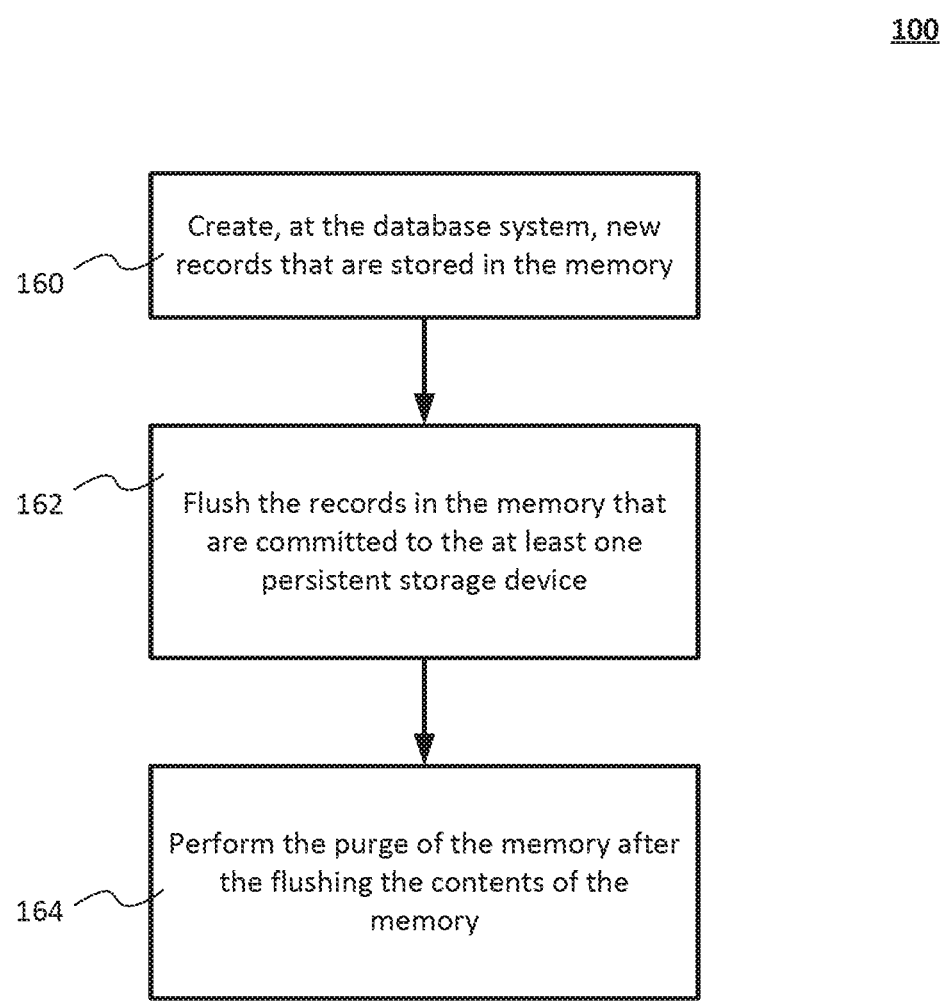

In implementations of the disclosed subject matter, uncommitted records may not be written to persistent storage in the database system. Committed records may be written to persistent storage (i.e., flushed), with a delay. Storage space in a database system consumed by flushed records in memory may not be reclaimed immediately. A combination of the above may lead to memory pressure and/or out-of-memory error if no more memory is available to store further changes.

Implementations of the disclosed subject matter provide a database system having a Log-Structure Merge-tree (LSM) data structure, where the database system includes a memory component and persistent storage. The newest records are inserted into the memory first. A flush operation performed by the database system moves committed transactions to persistent storage. Once the records are stored in persistent storage, the records may be purged from the memory. Purging of flushed records make sure that the memory has enough room for future records.

Flushing creates a new version of the records in persistent storage at each flush operation, and each version of the records in persistent storage may be represented by metadata that is referred to as a manifest. That is, the manifest includes metadata for all data files and/or records in the persistent storage. The manifest, along with a state of the memory, indicates to a query received by the database system where to locate records. While a query is using a particular version of the manifest that reflects a particular state of the persistent storage, the database system may monitor the memory to make sure purging does not occur to remove any records the query expects to find there. Each committed record in the database system may be assigned a unique transaction commit number (XCN). When a flush operation is performed, it flushes records that are committed after the previous flush, and the manifests themselves are in XCN-order (i.e., a newer manifest has a higher maximum committed XCN). The manifest may include a maximum flushed XCN. When a query is using an older manifest, it reads records up to the maximum flushed XCN of that manifest from the persistent storage, and the query expects any newer records than that maximum flushed XCN to exist in the memory. The database system may not purge records from the memory that have XCNs that are higher (more recent) than the maximum flushed XCN associated with the oldest manifest that is still in use by a query.

A long running query to a database system holding on to an old manifest may cause various resource related issues. For example, the long-running query may block a memory component of the database system from purging. In database systems, such as those used in implementations of the disclosed subject matter, records in memory that have been flushed to persistent storage may be purged from memory. That is, the purging operation clears portions of memory to free up space in memory. However, when long running queries prevent purging, an out-of-memory condition may result, where the memory has been filled and there is no available memory space. In another example, the long running query may prevent the persistent storage represented by the manifest from being released, resulting in storage bloat.

In implementations of the disclosed subject matter, the responsibility of the detection of a purge of memory and subsequent refresh of the manifest may be shifted to the queries themselves. The memory purging may occur without regard to any on-going queries. In implementations of the disclosed subject matter, the query may check whether a memory purge has occurred, and a scan may be restarted using a new version of manifest from the last position. Such implementations may provide for records in memory to be stored in persistent storage as part of a flush operation, and then the records may be purged from memory to free space for new transactions to avoid having an out-of-memory error. Such implementations allow only changes from committed transactions to be flushed to persistent storage, and the database systems disclosed herein do not have to track both uncommitted and committed records in storage. By restarting the query using the new version of manifest, the database system is able to get the next record, without having to restart the query at the beginning of the records. This avoids having to re-scan the records as part of the scan operation, which saves time and database system resources for other queries and/or operations. That is, a long running query using an old manifest may cause resource-related issues, as it may block a memory purging operation from occurring, resulting in an out-of-memory condition. A long running query may prevent the storage from being released, resulting in storage bloat. New versions of the manifest may also be created by a merge operation. When performing a merge operation, old extents (e.g., files and/or records) may become obsolete, because all of their data has been moved to new extents. These old extents may become unused, and may be deleted and/or removed. In some implementations of the disclosed subject matter, the old extents may be retained, as long-running queries that use old manifests may still reference the old extents that are no longer referenced by the latest manifest version. Implementations of the disclosed subject matter address these problems by removing the dependency of memory purging from a long running query, and having such queries refresh their manifest.

The workflow of a scan may include starting the scan, followed by a series of getnext calls that return one record at a time, and then ending scan. Implementations of the disclosed subject matter check whether a memory purge has occurred after a first getnext call (e.g., in between first and second getnext calls, and/or between any two consecutive getnext calls), and if it has, restarts the scan using a new version of manifest from the last position. A scan returns the records in key order, which avoids the need to restart the scan from a beginning, but also allows for a consistent scan restart without having to worry about returning duplicate records. The check may be performed at times other than after a first nextgen call or between getnext operations. A scan that is holding onto an old manifest may be part of a query that may perform other operations after a first nextgen call or between getnext calls, or the query itself could be blocked on a database lock, while holding a reference to an old manifest. Implementations of the disclosed subject matter provide checks to be performed at various points during execution of a query. This may allow other scans under the same query to refresh the manifest, so that any restart of the query operation may retrieve the next record. In some implementations, the checks may be performed before performing a sort, and/or during a lock wait.

FIG. 1A shows a method 100 of restarting a scan operation from a last position using a new version of a manifest when it is determined that a memory purge has occurred according to an implementation of the disclosed subject matter. At operation 110, a database system (e.g., computer 600, distributed component 700, and/or second computer 800 shown in FIG. 4, and/or database systems 1200a-d shown in FIG. 5) having a memory (e.g., memory 670 and/or memory 900 shown in FIG. 4) to store committed records and/or uncommitted records and at least one storage device (e.g., storage 630, distributed component 700, and/or storage 810 shown in FIG. 4, and/or database systems 1200a-d shown in FIG. 5) to store records in persistent storage, may receive a query for a least one record. In some implementations, a unique commit number may be assigned for each committed record in the at least one storage device for records that are stored in persistent storage. The query may use a first version of a manifest, where each version of the records that are stored in persistent storage are represented by metadata that is part of the first version of the manifest. When the query is using the first version of the manifest, the query reads the records up to a maximum commit number for the first version of the manifest, and determines that any newer records than the maximum commit number are stored in the memory. That is, records with commit numbers that are greater than the maximum commit number are stored in memory, and any records that have commit numbers that are less than or equal to the maximum commit number are stored in persistent storage.

At operation 120, a scan operation may be started for at least one of the records (e.g., uncommitted records and/or committed records stored in memory) and the records that are stored in persistent storage based on the received query. The scan may be using a snapshot that is larger than the maximum flushed XCN. The scan operation may include one or more sub-scan operations, based on the received query. At operation 130, the database system may perform a first operation based on the scan operation. The first operation (and/or any second or subsequent operation) may be, for example, a retrieve next record operation (e.g., getnext), a sort operation, and/or a lock wait operation. The retrieve next record operation may retrieve a record from the memory or the storage, based on the query. The sort operation may arrange data to make it easier to understand, analyze, and/or visualize. The lock wait operation may be a wait operation for an incompatible lock on a record or table to be removed before executing one or more operations.

At operation 140, the database system may determine whether a purge of the memory has occurred after the first operation. For example, every scan of the memory may check whether a purge has occurred. As the memory may be purged by the database system without regard to the received query, the query is responsible for determining whether a purge operation may have occurred. The query may determine that the purge occurred based on the first version of the manifest, as well as the current state of the memory, which may be different from when the first operation occurred. To make this determination, the query may use the maximum flushed XCN associated with the current manifest. If the maximum flushed XCN of the current manifest is different than the maximum flushed XCN of the old manifest, then the scan may refresh the current manifest. In some implementations, the database system may determine whether a purge of the memory has occurred between the first operation and a second operation (e.g., any consecutive getnext operations, or the like).

At operation 150, when the database system determines that the memory purge has occurred, the database system may restart the scan operation from a last position of the scan operation prior to the memory purge using a second version of the manifest. The second version of the manifest may be a new version (i.e., a refreshed version) of the manifest, and the first version of the manifest may be the old version of the manifest. The restarting the scan operation may include refreshing the manifest to generate the second version of the manifest (i.e., the new manifest), as shown in FIG. 1C and described below. Based on one or more operations by the database system, the query may be instructed to restart the scan, and to use the second version of the manifest.

Figure 1C:
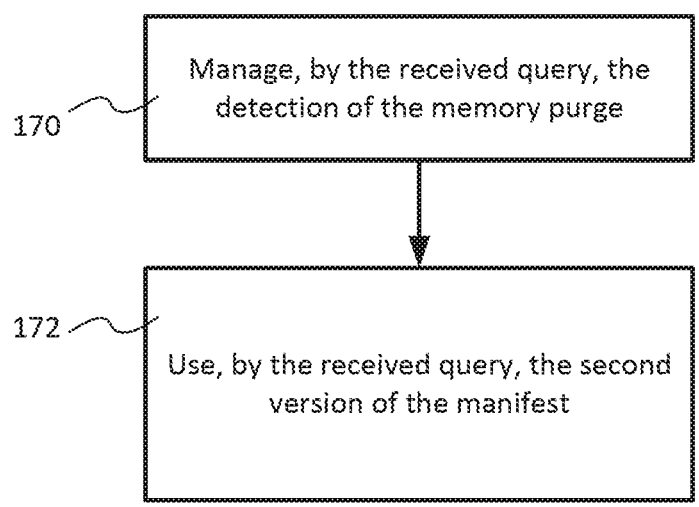

FIG. 1B shows optional operations of method 100 according to implementations of the disclosed subject matter. At operation 160, the database system may create new records that are stored in the memory (e.g., memory 670 and/or memory 900 shown in FIG. 4). At operation 162, the database system may flush the committed records stored in the memory to the at least one storage device (e.g., storage 630, distributed component 700, and/or storage 810 shown in FIG. 4, and/or database systems 1200a-d shown in FIG. 5). A new version of the manifest may be created when the flush is completed, and queries may begin using the new manifest. At operation 164, the database system may perform the purge of the memory after the flushing the memory. The purge of the memory may be delayed in time after the flush operation, and may be performed by a different process. Before the start of the purge operation, the XCN up to which the records are purged (i.e., the target purge XCN) may be updated in the memory.

FIG. 1C shows optional operations of method 100 according to implementations of the disclosed subject matter. At operation 170, the received query may manage the detection of the memory purge (e.g., memory e.g., memory 670 and/or memory 900 shown in FIG. 4). A new version (e.g., a second version) of a manifest may be created by a flush or a merge operation. At operation 172, the query may use the second version of the manifest, which may include a new extent.

Figure 4:
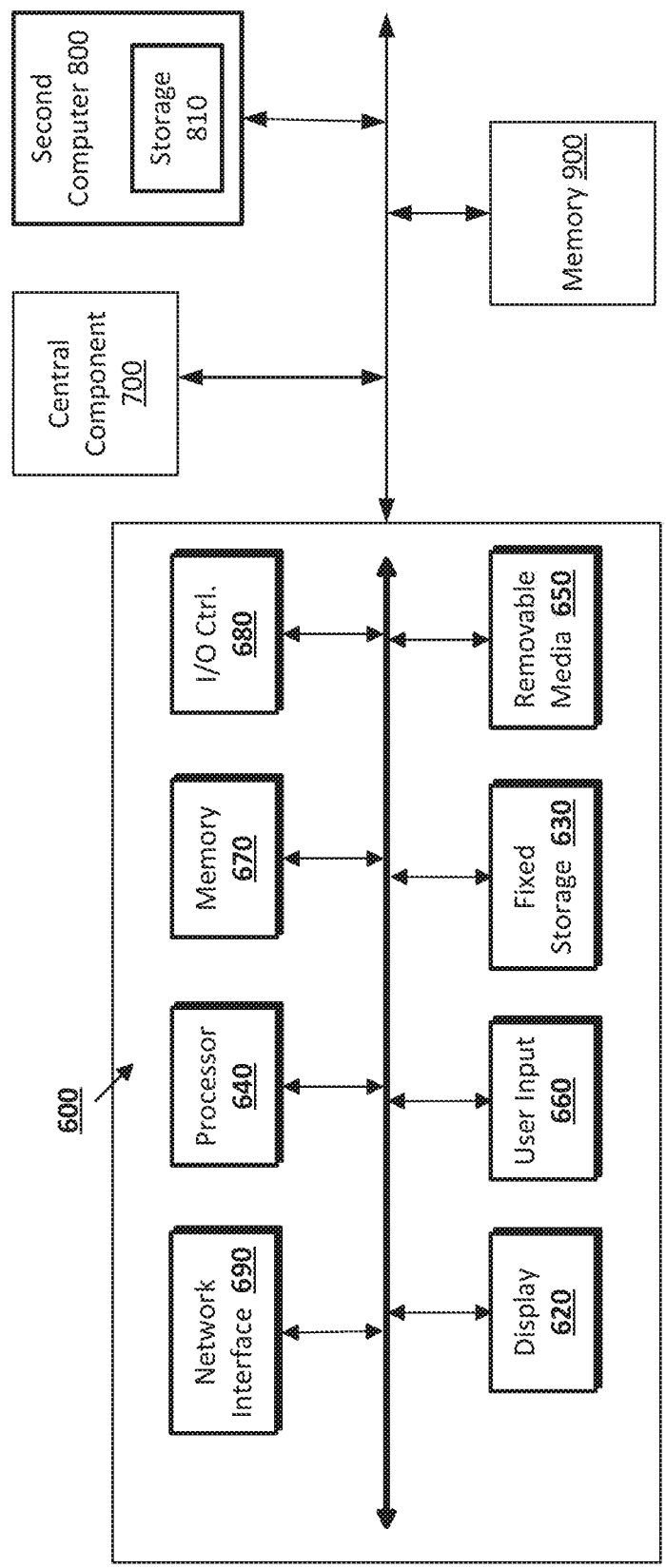
FIG. 4 shows a computers, servers and shared memory of a database system according to implementations of the disclosed subject matter.
Figure 5:
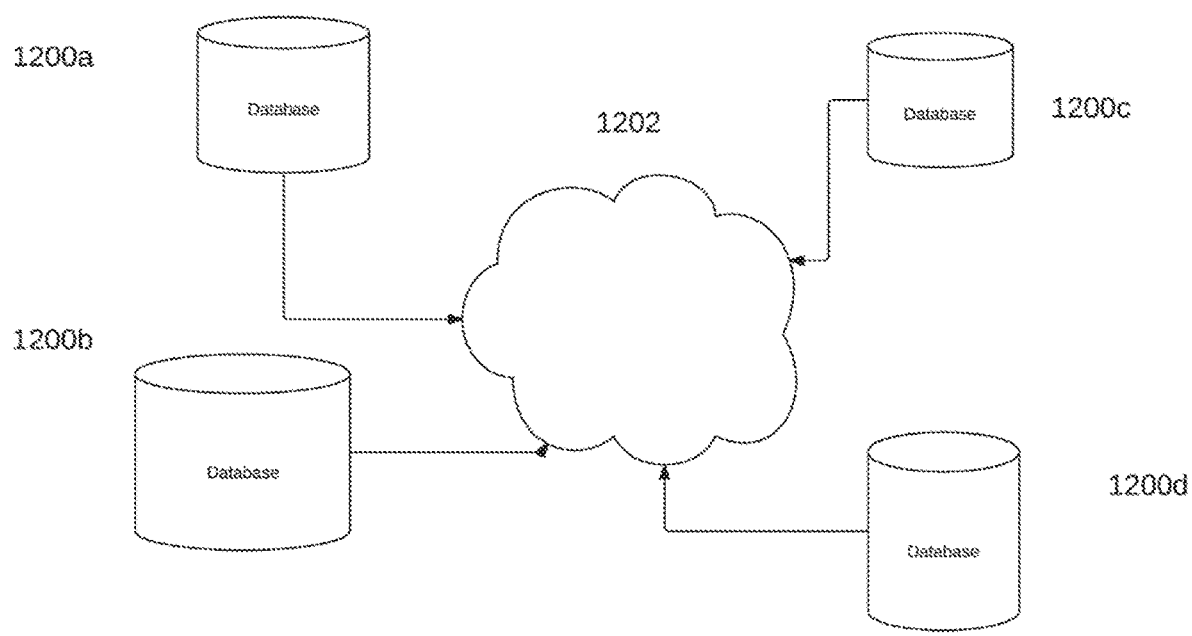
FIG. 5 shows a computer according to an implementation of the disclosed subject matter.

In the method 100 shown in FIGS. 1A-1C, a scan may hold the reference to a manifest that has a particular maximum flushed XCN, which is a point in time in which data of the memory is written to persistent storage (e.g., in the storage 630, distributed component 700, and/or storage 810 shown in FIG. 4, and/or database systems 1200a-d shown in FIG. 5). This scan may find records that are newer than this maximum flushed XCN from the memory (e.g., memory 670 and/or memory 900 shown in FIG. 4). The longer the query takes to execute (e.g., such as waiting for the transfer of a lock from one workflow to another workflow), the longer these records will have to stay in memory. Prior to the implementations of the disclosed subject matter, this may have caused numerous out-of-memory errors.

Implementations of the disclosed subject matter allow a purge of the memory to be non-blocking, regardless of whether there may be open scans with old manifests. Each scan may be given the responsibility to detect that a purge is happening, has happened, or is about to happen. For example, this detection may occur at each getnext call, which retrieves the next record. By having the scan detect whether a purge has occurred, this decouples the manifest from purging. A scan may hold onto a manifest, but it will no longer block purge as a result. The scan may hold a reference to a particular manifest between two getnext calls, regardless of how long that may take. In implementations of the disclosed subject matter, the future getnext call may use a new version of the manifest if there is a chance that a purge may have happened in the meantime. The check made by the scan may be performed when it is fetching from the memory, and may be synchronized with purging the memory.

FIGS. 2A-2B show an example for checking a purge in accordance with implementations of the disclosed subject matter. The memory and the persistent storage may start out with records, such as shown in FIG. 2A. The records of the persistent storage may be represented by a first version of a manifest with a maximum flushed XCN of 8, and a purger may have its purge target XCN set to 0. The purger may be an operation of the database system that performs a purge operation, and indirectly provides information to the scan by posting a new purge target XCN before starting its work, indicating that all records up to that target XCN are subject to disappear from memory without further notice. It does this by updating the purge target XCN, as shown in FIGS. 2A-2B. The purge target XCN may be a transaction commit number for the next committed transaction in the storage after the purge operation. Whenever a flush happens, the maximum flushed XCN of the new manifest (i.e., the new manifest or the second version of the manifest) that is created will be higher than for the previous manifest (i.e., the old manifest or the first version of the manifest). After the new manifest has been created successfully, a purge request may be created with that new maximum flushed XCN. When the purger is free to perform an operation, it picks up the new purge request, and begins performing the purging. As the first step in performing the purging, the purger sets the purge target XCN to the maximum flushed XCN.

From the state of the records shown in FIG. 2A, a range query may start at key 'a'. The range query initialized the memory scan using 8, which is the scan maximum flush XCN. In this example, at the first operation to retrieve a record (e.g., a first getnext call), the memory may be checked, and it may be determined that a purge has not occurred. The record 'a' may be returned. Continuing the example, a flush occurs, and a second version of the manifest may be produced at a maximum flush XCN of 10. In this example, a purge (removing the contents of the memory) may be triggered after the flush and setting the maximum flush XCN to 10. The purger may update the targetPurgeXcn=10. The resulting system is shown in FIG. 2B, and the record 'a' remains in the memory. That is, the record 'a' remains pinned to the memory, as the scan is currently positioned on this record. The purger purges records on which a scan is currently positioned on, even if they are older than the purge target XCN.

In this example, the query may perform a second operation to retrieve (e.g., call the second getnext), and a scan of the memory for the next record finds no more records in the memory. The query may compare the scan's maximum flush XCN (8) to the targetPurgeXcn (10) to determine that a purge occurred, and it informs the query to restart the entire scan, using the second version of the manifest. The query is returned to the previous record, 'a'. A new start key is constructed, the old scans are cleaned up, and new scans are created using the new start key. Sub-scans on each level of the LSM may be referred to as "scanlets". The clean-up of old scans may close all currently open scanlets, and new scanlets may be opened for all levels and extents for the new version of the manifest. The record 'b' may then be retrieved from persistent storage. In the example above, if the query was not told to restart its scan, then the query would continue to use the first version of the manifest (i.e., the old manifest), rather than the new manifest (e.g., the second version of the manifest).

FIGS. 3A-3B show an example of an active purge occurring when a scan starts in accordance with implementations of the disclosed subject matter. The maximum flush XCN that a scan is using for this example is greater than the purge target XCN to begin with, and there is no restart necessary. As shown in FIGS. 3A-3B, for a(9) and/or c(3), the numbers in parentheses (e.g., 9 and 3) may be the transaction commit numbers of a record.

As shown in FIG. 3A, a purge may already be occurring with a purge target XCN of 4. The purger may have purged from bucket 'a', but since the current record in memory at key 'a' has a maximum flush XCN of 9, it is not purged and remains in the memory. In this example, a new scan may start. The new scan uses the latest manifest (i.e., the first version of the manifest), which has a maximum flush XCN of 7. The query may call a first getnext operation. As the rxt is greater than the targetPurgeXcn, a restart is not triggered, and 'a' is returned. The purger may purge the record at 'c' (XCN=3), as shown in FIG. 3B. The query may perform a second operation to retrieve (e.g., call the second getnext). The query is using the latest manifest (i.e., the first version of the manifest), so it returns record 'c' from the scan of the persistent storage.

Implementations of the presently disclosed subject matter may be implemented in and used with a variety of component and network architectures. FIG. 4 is an example computer 600 suitable for implementing implementations of the presently disclosed subject matter. As discussed in further detail herein, the computer 600 may be a single computer in a network of multiple computers. As shown in FIG. 4, the computer 600 may communicate with a central or distributed component 700 (e.g., server, cloud server, database, cluster, application server, etc.). The central component 700 may communicate with one or more other computers such as the second computer 800, which may include a storage device 810. In some implementations, the computer 600 and/or the central component 700 may be the database system as described above.

The second computer 800 may be a server, cloud server, or the like. The storage 810 may use any suitable combination of any suitable volatile and non-volatile physical storage mediums, including, for example, hard disk drives, solid state drives, optical media, flash memory, tape drives, registers, and random access memory, or the like, or any combination thereof. In some implementations, the storage 810 of the second computer 800 may be the persistent storage, as described above.

The memory 900 may be any suitable combination of any suitable volatile and non-volatile physical storage mediums, including, for example, solid-state memory, hard disk drives, solid state drives, optical media, flash memory, tape drives, registers, and random access memory, or the like, or any combination thereof. The memory 900 may be communicatively coupled to a processor, memory controller, communications interface, and/or one or more computers. The contents of memory 900 may be flushed to storage 810 so that the records may be stored in persistent storage. The contents of the memory may be purged so as to avoid causing out-of-memory errors.

Data may be stored in any suitable format in, for example, the memory 670, the fixed storage 630, the central component 700, the storage 810, the storage catalog server 850, and/or the memory 900 using any suitable file system or storage scheme or hierarchy. For example, the storage 630, the central component 700, and/or the storage 810 may store data using a log structured merge (LSM) tree with multiple levels, which may be persistent storage to store records. In this example, the memory 670 and/or the memory 900 may store records prior to being flushed to persistent storage, and may be purged.

If the systems shown in FIGS. 4-5 are multitenant systems, the storage may be organized into separate log structured merge trees for each instance of a database for a tenant. Alternatively, contents of all records on a particular server or system may be stored within a single log structured merge tree, in which case unique tenant identifiers associated with versions of records may be used to distinguish between data for each tenant. More recent transactions may be stored at the highest or top level of the tree and older transactions may be stored at lower levels of the tree. Alternatively, the most recent transaction or version for each record (i.e., contents of each record) may be stored at the highest level of the tree and prior versions or prior transactions at lower levels of the tree.

The information obtained to and/or from a central component 700 may be isolated for each computer such that computer 600 may not share information with computer 800. Alternatively or in addition, computer 600 may communicate directly with the second computer 800.

The computer (e.g., user computer, enterprise computer, etc.) 600 may include a bus 610 which interconnects major components of the computer 600, such as a central processor 640, a memory 670 (typically RAM, but which may also include ROM, flash RAM, or the like), an input/output controller 680, a user display 620, such as a display or touch screen via a display adapter, a user input interface 660, which may include one or more controllers and associated user input or devices such as a keyboard, mouse, WiFi/cellular radios, touchscreen, microphone/speakers and the like, and may be closely coupled to the I/O controller 680, fixed storage 630, such as a hard drive, flash storage, Fibre Channel network, SAN device, SCSI device, and the like, and a removable media component 650 operative to control and receive an optical disk, flash drive, and the like.

The bus 610 enable data communication between the central processor 640 and the memory 670, which may include read-only memory (ROM) or flash memory (neither shown), and random access memory (RAM) (not shown), as previously noted. The RAM can include the main memory into which the operating system and application programs are loaded. The ROM or flash memory can contain, among other code, the Basic Input-Output system (BIOS) which controls basic hardware operation such as the interaction with peripheral components. Applications resident with the computer 600 can be stored on and accessed via a computer readable medium, such as a hard disk drive (e.g., fixed storage 630), an optical drive, floppy disk, or other storage medium 650.

The fixed storage 630 may be integral with the computer 600 or may be separate and accessed through other interfaces. A network interface 690 may provide a direct connection to a remote server via a telephone link, to the Internet via an internet service provider (ISP), or a direct connection to a remote server via a direct network link to the Internet via a POP (point of presence) or other technique. The network interface 690 may provide such connection using wireless techniques, including digital cellular telephone connection, Cellular Digital Packet Data (CDPD) connection, digital satellite data connection or the like. For example, the network interface 690 may enable the computer to communicate with other computers via one or more local, wide-area, or other networks, as shown in FIG. 5.

Many other devices or components (not shown) may be connected in a similar manner (e.g., data cache systems, application servers, communication network switches, firewall devices, authentication and/or authorization servers, computer and/or network security systems, and the like). Conversely, all of the components shown in FIG. 5 need not be present to practice the present disclosure. The components can be interconnected in different ways from that shown. The operation of a computer such as that shown in FIGS. 4-5 is readily known in the art and is not discussed in detail in this application. Code to implement the present disclosure can be stored in computer-readable storage media such as one or more of the memory 670, fixed storage 630, removable media 650, or on a remote storage location.

FIG. 5 shows an example network arrangement according to an implementation of the disclosed subject matter. Four separate database systems 1200*a-d* at different nodes in the network represented by cloud 1202 communicate with each other through networking links 1204 and with users (not shown). Each of database systems 1200 may be operable to host multiple instances of a database, where each instance is accessible only to users associated with a particular tenant. Each of the database systems may constitute a cluster of computers along with a storage area network (not shown), load balancers and backup servers along with firewalls, other security systems, and authentication systems. Some of the instances at any of systems 1200 may be live or production instances processing and committing transactions received from users or from computing elements (not shown) for ingesting and providing data for storage in the instances.

One or more of the database systems 1200*a*-1200*d* may be used as a master database system, and one or more of the database systems 1200*a*-1200*d* may be used as a DR database system. For example, one or more authorized users of the database systems 1200*a*-1200*d* that are associated with the original tenant may request that a sandbox be created by one of the database systems 1200*a*-1200*d*. The system, for example 1200*c*, may include at least one storage device, such as in FIG. 4. For example, the storage may include memory 670, fixed storage 630, removable media 650, a storage device included with the central component 700 and/or the second computer 800, and/or one or more storage devices associated with one or more of the database systems 1200*a*-1200*d*.

The systems and methods of the disclosed subject matter may be for single tenancy and/or multi-tenancy systems. Multi-tenancy systems may allow various tenants, which may be, for example, users, groups of users, or organizations, to access their own records on the server system through software tools or instances on the server system that may be shared among the various tenants. The contents of records for each tenant may be part of a database for that tenant. Contents of records for multiple tenants may all be stored together within the same server system, but each tenant may only be able to access contents of records which belong to, or were created by, that tenant. This may allow a server system to enable multi-tenancy without having to store each tenants' contents of records separately, for example, on separate servers or server systems. The database for a tenant may be, for example, a relational database, hierarchical database, or any other suitable database type. All records stored on the server system may be stored in any suitable structure, including, for example, a LSM tree.

A record as disclosed herein may be identified by a key-value pair in the instance of a multi-tenant system. In the implementations discussed above, the databases may not have notions of tenancy. Tenancy in the databases may be created by one or more virtual overlays, so that a user may view, access, and/or perform operations for a tenancy associated with an authorized user of a database system. The value may be, for example, the contents of a row of a table of a relational database, an identification of a row in a table of a relational database, or any other suitable value. The key may be an identifier for the record, and may in any suitable form, such as, for example, an alphanumeric sequence. Portions of the key may provide information about the contents of the record. For example, a portion of the key may be a tenant identifier, which may uniquely identify the tenant to whom the contents of the record belongs. Other portions of the key may identify, for example, a table number and identification of a row, for example, when the value of a record is the contents of a row, or table number, index number on the table, and an identification of indexed columns when the value is the identification of a row.

Further, a multitenant system may have various tenant instances on server systems distributed throughout a network with a computing system at each node. The live or production database instance of each tenant may only have its transactions processed at one computer system. The computing system for processing the transactions of that instance may also process transactions of other instances for other tenants.

More generally, various implementations of the presently disclosed subject matter may include or be implemented in the form of computer-implemented processes and apparatuses for practicing those processes. Implementations also may be implemented in the form of a computer program product having computer program code containing instructions implemented in non-transitory and/or tangible media, such as floppy diskettes, CD-ROMs, hard drives, USB (universal serial bus) drives, or any other machine readable storage medium, wherein, when the computer program code is loaded into and executed by a computer, the computer becomes an apparatus for practicing implementations of the disclosed subject matter. Implementations also may be implemented in the form of computer program code, for example, whether stored in a storage medium, loaded into and/or executed by a computer, or transmitted over some transmission medium, such as over electrical wiring or cabling, through fiber optics, or via electromagnetic radiation, wherein when the computer program code is loaded into and executed by a computer, the computer becomes an apparatus for practicing implementations of the disclosed subject matter. When implemented on a general-purpose microprocessor, the computer program code segments configure the microprocessor to create specific logic circuits. In some configurations, a set of computer-readable instructions stored on a computer-readable storage medium may be implemented by a general-purpose processor, which may transform the general-purpose processor or a device containing the general-purpose processor into a special-purpose device configured to implement or carry out the instructions. Implementations may be implemented using hardware that may include a processor, such as a general purpose microprocessor and/or an Application Specific Integrated Circuit (ASIC) that implements all or part of the techniques according to implementations of the disclosed subject matter in hardware and/or firmware. The processor may be coupled to memory, such as RAM, ROM, flash memory, a hard disk or any other device capable of storing electronic information. The memory may store instructions adapted to be executed by the processor to perform the techniques according to implementations of the disclosed subject matter.

The foregoing description, for purpose of explanation, has been described with reference to specific implementations. However, the illustrative discussions above are not intended to be exhaustive or to limit implementations of the disclosed subject matter to the precise forms disclosed. Many modifications and variations are possible in view of the above teachings. The implementations were chosen and described in order to explain the principles of implementations of the disclosed subject matter and their practical applications, to thereby enable others skilled in the art to utilize those implementations as well as various implementations with various modifications as may be suited to the particular use contemplated.

The invention claimed is:

1. A method comprising:
   receiving, at a database system having a memory and at least one persistent storage device to store records, a query for a least one record, wherein the query uses a first version of a manifest, and wherein each version of the records that are stored in the at least one persistent storage device are represented by metadata that is part of the first version of the manifest;
   starting a scan operation of at least one of the records stored in the memory and the records that are stored in the at least one persistent storage device based on the received query;
   performing a first operation based on the scan operation;
   determining, at the database system, whether a purge of the memory has occurred after the first operation and while performing the query; and
   when it is determined that the memory purge has occurred while performing the query, restarting the scan operation from a last position of the scan operation prior to the memory purge using a second version of the manifest.

2. The method of claim 1, wherein the first operation is selected from the group consisting of: a retrieve next record operation, a sort operation, and a lock wait operation.

3. The method of claim 1, wherein the restarting the scan operation comprises:
refreshing the manifest to generate the second version of the manifest.

4. The method of claim 1, wherein the scan operation includes one or more sub-scan operations, based on the received query.

5. The method of claim 1, further comprising:
creating, at the database system, new records that are stored in the memory;
flushing the records in the memory that are committed to the at least one persistent storage device,
wherein the purge of the memory is performed after the flushing.

6. The method of claim 1, wherein when the query is using the first version of the manifest, the query reads the records up to a maximum commit number for the first version of the manifest, and determines that any newer records than the maximum commit number are stored in the memory.

7. The method of claim 1, further comprising:
purging the memory, at the database system, without regard to the received query.

8. The method of claim 1, further comprising:
managing, by the received query, the detection of the memory purge; and
using, by the received query, the second version of the manifest.

9. A database system comprising:
a memory and at least one persistent storage device to store records;
a processor to receive a query for a least one record, wherein the query uses a first version of a manifest, and wherein each version of the records that are stored in persistent storage are represented by metadata that is part of the first version of the manifest, to start a scan operation of at least one of the records that are stored in memory and the records stored in the at least one persistent storage device based on the received query;
performing a first operation based on the scan operation;
determining, at the database system, whether a purge of the memory has occurred after the first operation and while performing the query; and
when it is determined that the memory purge has occurred while performing the query, restarting the scan operation from a last position of the scan operation prior to the memory purge using a second version of the manifest.

10. The system of claim 9, wherein the first operation is selected from the group consisting of: a retrieve next record operation, a sort operation, and a lock wait operation.

11. The system of claim 9, wherein the processor restarts the scan operation by refreshing the manifest to generate the second version of the manifest.

12. The system of claim 9, wherein the scan operation performed by the processor includes one or more sub-scan operations, based on the received query.

13. The system of claim 9, wherein the processor creates new records that are stored in the memory, and flushes the records in the memory that are committed to the at least one persistent storage device,
wherein the purge of the memory is performed by the processor after the flushing.

14. The system of claim 9, wherein when the query is using the first version of the manifest, the query reads the records up to a maximum commit number for the first version of the manifest, and the processor determines that any newer records than the maximum commit number are stored in the memory.

15. The system of claim 9, wherein the processor purges the memory without regard to the received query.

16. The system of claim 9, wherein the processor manages, by the received query, the detection of the memory purge, and the query uses the second version of the manifest.

* * * * *